United States Patent [19]
Alvey

[11] Patent Number: 5,522,776
[45] Date of Patent: Jun. 4, 1996

[54] ELECTRONIC NEUTRAL TOW ENGAGEMENT FOR AN AUTOMATIC FOUR-WHEEL-DRIVE VEHICLE

[75] Inventor: Raymond S. Alvey, Utica, Mich.

[73] Assignee: Ford Motor Company, Dearborn, Mich.

[21] Appl. No.: 352,669

[22] Filed: Dec. 9, 1994

[51] Int. Cl.[6] ............................ F16H 3/54; B60K 17/346
[52] U.S. Cl. ............................ 477/35; 475/221; 475/295; 477/36
[58] Field of Search ..................................... 475/295, 221; 477/35, 36

[56] References Cited

U.S. PATENT DOCUMENTS

| | | | |
|---|---|---|---|
| 4,613,008 | 10/1986 | Hiraiwa et al. | 180/247 |
| 4,690,015 | 9/1987 | Nagano et al. | 475/295 |
| 5,057,062 | 10/1991 | Yamasaki et al. | 475/221 |

Primary Examiner—Charles A. Marmor
Assistant Examiner—Sherry Estremsky
Attorney, Agent, or Firm—Frank G. McKenzie; Roger L. May

[57] ABSTRACT

An automatic four-wheel-drive vehicle having a multiple-ratio transmission with a torque output shaft connected drivably to a rear driving axle and a transfer gear box having a front drive shaft connected drivably to a front axle, the transfer case providing a four-wheel low-drive mode, a neutral mode and a two-wheel-drive/automatic four-wheel drive mode, an electric motor adapted to shift the transfer case from one mode to another mode and an electronic controller responsive to predetermined driving conditions for effecting an automatic shift of the transfer case from either a forward drive mode or a reverse drive mode to the neutral drive mode whereby the vehicle is conditioned for towing by interrupting the torque flow path from the rear drive wheels of the vehicle to the transmission mechanism and transfer case.

6 Claims, 9 Drawing Sheets

ELECTRONIC NEUTRAL TOW ENGAGEMENT FOR AN AUTOMATIC FOUR-WHEEL-DRIVE VEHICLE

TECHNICAL FIELD

My invention relates to an automatic transfer case for an automatic four-wheel-drive vehicle having a multiple-ratio transmission.

BACKGROUND OF THE INVENTION

My invention is an improvement in four-wheel-drive powertrains having an internal combustion engine and a multiple-ratio, geared transmission. The crankshaft of the engine is connected to torque input gearing of the transmission and the output shaft of the transmission is connected to a rear drive shaft, which delivers torque to a rear differential and to rear traction wheels for the vehicle.

A transfer case normally is used to provide a torque flow path to the front vehicle wheels of an all-wheel drive vehicle. The transfer case in a typical arrangement would be assembled on the housing of the multiple-ratio transmission. A drive chain may be used to connect drivably a torque output element of the transmission to a torque input element of the transfer gear case. The power input shaft of the transfer gear case, in a typical environment, would be connected to a sun gear of a planetary gear unit. The ring gear of the planetary gear unit would be fixed. A carrier for such planetary gear units carries a pinion assembly comprising pinions drivably engaged with the sun gear and the ring gear. The carrier is the torque output element of the transfer case planetary gearing.

A positive engagement clutch may be used to connect drivably the rear output shaft of the transfer case to the power input shaft for the transfer case, the latter being connected to the output of the multiple-ratio transmission. When the positive engagement clutch is shifted in the opposite direction, the power input sun gear drives the rear output shaft for the transfer case through the planetary gearing as the carrier becomes connected to the rear output shaft. When the positive engagement clutch is moved to an intermediate position, the torque delivery path from the power input shaft for the transfer case is interrupted and a connection between the rear output shaft and the carrier is disestablished.

Thus, the transfer case has three operating modes; i.e., a four-wheel, high-speed mode, a four-wheel, low-speed mode and a neutral mode. A secondary clutch assembly is used to disconnect the drive chain from the rear output shaft if it is desired to operate the vehicle in a two-wheel-drive mode.

BRIEF DESCRIPTION OF THE INVENTION

The improvements of my invention comprise an electronic control system for actuating the clutch that establishes and disestablishes the high-speed, four-wheel-drive mode, the neutral drive mode and the low-speed, four-wheel-drive mode without requiring a driver operated shift mechanism. A reversible electric motor is mechanically connected to a shiftable clutch sleeve in the transfer case. The motor in turn is actuated in a clockwise direction or in a counter-clockwise direction to effect a shifting movement of the positive drive clutch to the high-speed two-wheel or four-wheel drive mode, a low-speed, two-wheel or four-wheel drive mode or to a position intermediate the high and low speed positions.

The motor is under the control of a microprocessor control system that senses predetermined initial conditions for the vehicle driveline and that responds to a verification of the fulfillment of the initial conditions to effect clockwise motion or counterclockwise motion of a drive motor for the positive engagement clutch to disengage the clutch when towing of the vehicle is desired. This avoids an undesirable condition in which, during towing of the vehicle, the rear wheels drive the rear drive shaft and the transmission gearing. The selection of a neutral tow function is achieved by the operator merely by opening or closing a switch that conditions the transfer case for operation in the neutral tow mode.

PARTICULAR DESCRIPTION OF THE INVENTION

Figure 2:
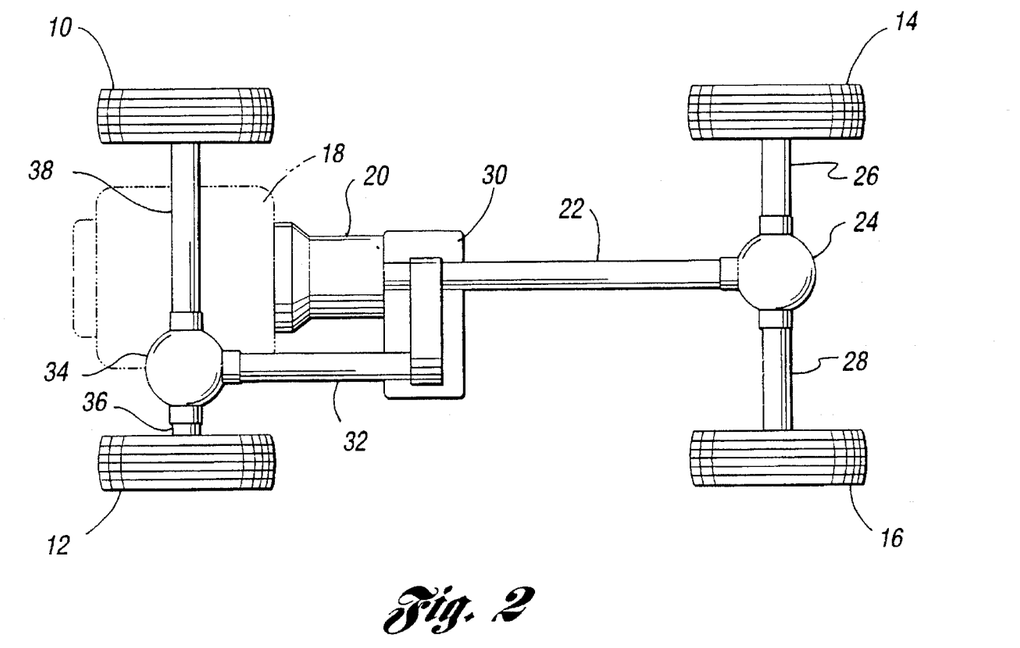
FIG. 2 is a schematic block diagram of a four-wheel-drive powertrain showing the relationship between the engine, the transfer case and the traction wheels.

FIG. 2 shows a four-wheel-drive vehicle and vehicle driveline. The vehicle includes front road wheels 10 and 12 and rear road wheels 14 and 16. An engine 18 delivers torque to an input element of a multiple-ratio transmission shown schematically at 20. The output shaft of the transmission is connected in the usual fashion, by means of a universal joint, to a rear drive shaft 22 which delivers torque to the torque input pinion of a geared differential mechanism 24, the latter delivering torque to each of two rear wheel axles 26 and 28.

A transfer case 30 is secured to the transmission and forms a part of the transmission assembly. A torque output driven element of the transfer case 30 is connected to a front-wheel drive shaft 32, which delivers torque to a front geared differential 34. First and second front axle shafts 36 and 38 deliver torque to the front traction wheels from the differential 34. In the case of front-wheel axle shaft 38, a center axle disconnect clutch 40 is situated between one of the front traction wheels, such as wheel 10, and the differential mechanism 34.

Figure 2A:
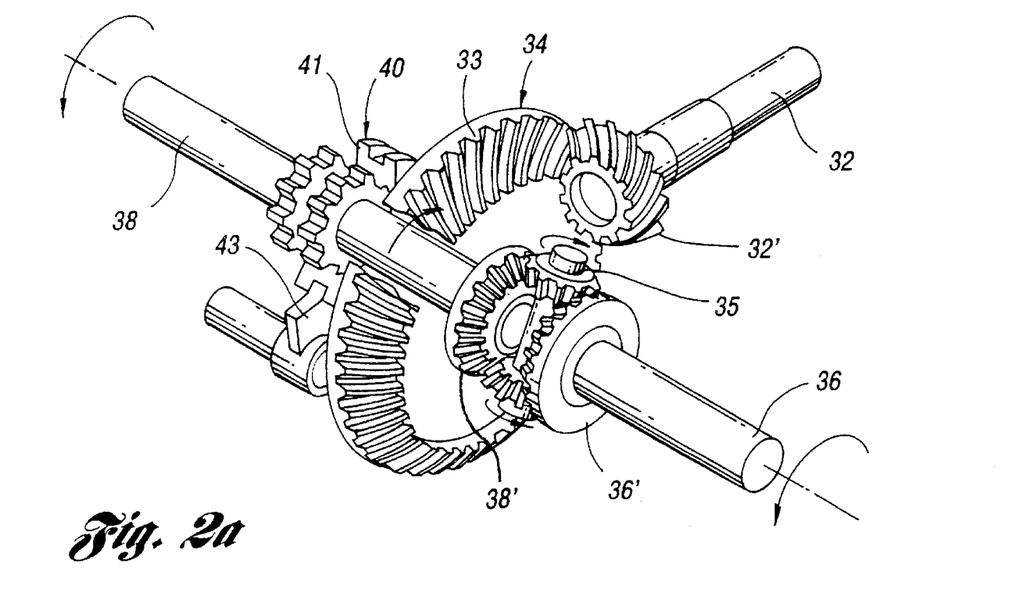
FIG. 2A is an isometric schematic view of a front axle differential for use in a four-wheel driveline of the kind shown in FIG. 2.

The front drive shaft drives differential torque input 32' which measures with differential ring gear 33. Differential pinions 35 are carried by a differential housing which supports the ring gear 33. They mesh with differential side gear 36', which is connected to axle shaft 36, and to differential side gear 38' which is connected to front axle shaft 38. As mentioned previously, the center axle disconnect 40 is adapted to interrupt torque flow through the axle shaft 38 when it is disconnected thereby separating the inboard end of the shaft 38 from the outboard end. The separate portions of the axle shaft 38 carry gear members with external gear teeth which are engageable with internal teeth formed on a clutch sleeve 41, which can be shifted in the direction of the axis of the shaft 38 into engagement and out of engagement in known fashion by means of a shift fork 43.

The rear axle differential 24 functions in a manner similar to the function of the front axle differential 34 and has corresponding torque transfer components.

Figures 1, 1A:
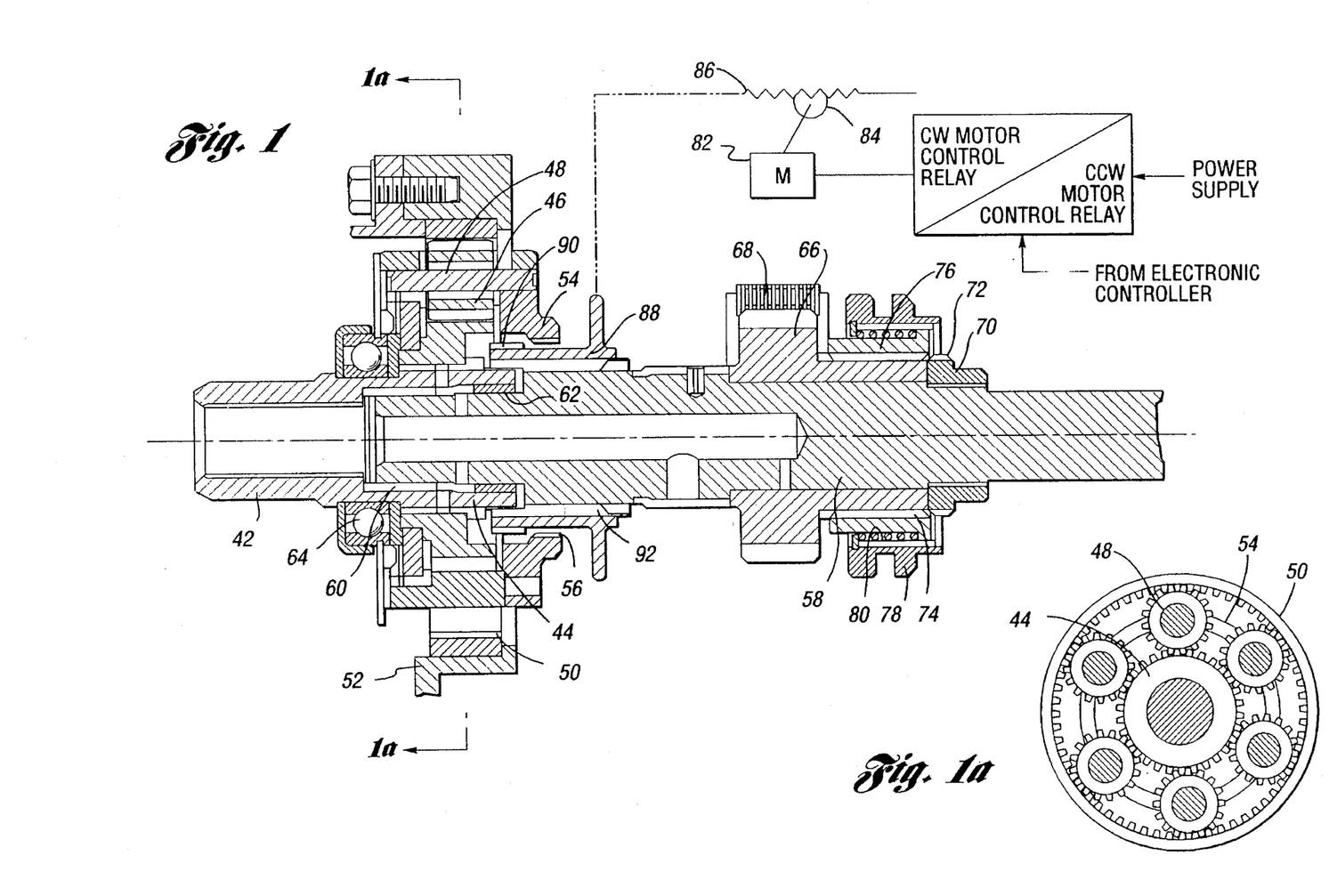
FIG. 1 is a cross-sectional assembly view of a transfer case for use in a four-wheel-drive powertrain for a wheeled vehicles.
FIG. 1A is a cross-sectional view of the planetary gearing for the transfer case as seen from the plane of section line 1A—1A of FIG. 1.

The torque output shaft of the transmission is connected to torque input shaft 42 for the transfer case of FIG. 1. Torque input shaft 42 is formed with or is connected integrally to sun gear element 44 of a planetary gear assembly. A planet carrier assembly 46 comprising planet pinions 48 mesh drivably with ring gear element 50 for the transfer case and with sun gear element 44. The ring gear element 50 is secured to transfer case housing 52.

The planet carrier assembly includes a carrier 54 which rotatably supports the planet pinions 48. The carrier 54 is provided with internal clutch teeth 56.

A rear output shaft 58 is journalled by bearing 60 in a bearing pocket formed in the input shaft 42. Sun gear element 44 is supported on shaft 58 by bearing 62. Shaft 42 is journalled by end bearing 64.

A drive sprocket 66 is rotatably supported by shaft 58. A drive chain 68 forms a torque transfer drive between sprocket 66 and a corresponding driven sprocket, which is connected drivably to the front drive shaft 32, thereby completing a torque flow path from input shaft 42 to front drive shaft 32. A drive collar 70 is splined to shaft 58. It is provided with external clutch teeth 72 which are adapted to engage drivably internal spline teeth 74 on a clutch sleeve 76. A shift collar 78 surrounds the sleeve 76. Collar 78 may be actuated by a driver controlled shift fork in known fashion.

When the collar 78 is moved in a right-hand direction, compression spring 80 is compressed whereby imparting a shifting force on the sleeve 76 urging the internal teeth of the sleeve 76 into clutching engagement with the external teeth 72. This establishes a driving connection between the shaft 58 and the sprocket 66. When the sprocket 66 is drivably connected to the shaft 58, the driveline is conditioned for four-wheel drive. When the internal teeth 74 of the sleeve 76 are disengaged from the teeth 72, torque delivery to the front axles is interrupted. The vehicle then operates in the two-wheel-drive mode.

A reversible electric motor 82 drives a pinion 84 which in turn actuates a gear rack 86. A positive engagement clutch sleeve 88 is connected mechanically, as shown schematically in FIG. 1, to the rack 86. The rack 86, when it is actuated by the reversible electric motor 82, will shift the sleeve 88 in the right-hand direction or left-hand direction depending upon the direction of motion of the motor 82.

External clutch teeth 90 are carried by the sleeve 88. Teeth 90 are adapted to engage teeth 56 when the sleeve 88 is shifted in the right-hand direction thereby establishing a driving connection between rear output shaft 58 and carrier 54. The sleeve 88 is internally splined on an externally splined portion of the rear shaft 58, the spline connection being shown generally at 92.

The internal clutch teeth of the sleeve 88 are adapted to drivingly engage sun gear element 44 when the sleeve 88 is shifted in the left-hand direction as viewed in FIG. 1. When it is shifted into engagement with the sun gear element 44, the sleeve 88 establishes a direct drive connection between the input shaft 42 and the rear output shaft 58. On the other hand, when the sleeve is shifted in a right-hand direction, a speed reduction occurs as the power input shaft 42 drives rear output shaft 58, the ring gear element 50 acting as a reaction element for the planetary gearing.

Figure 3A:
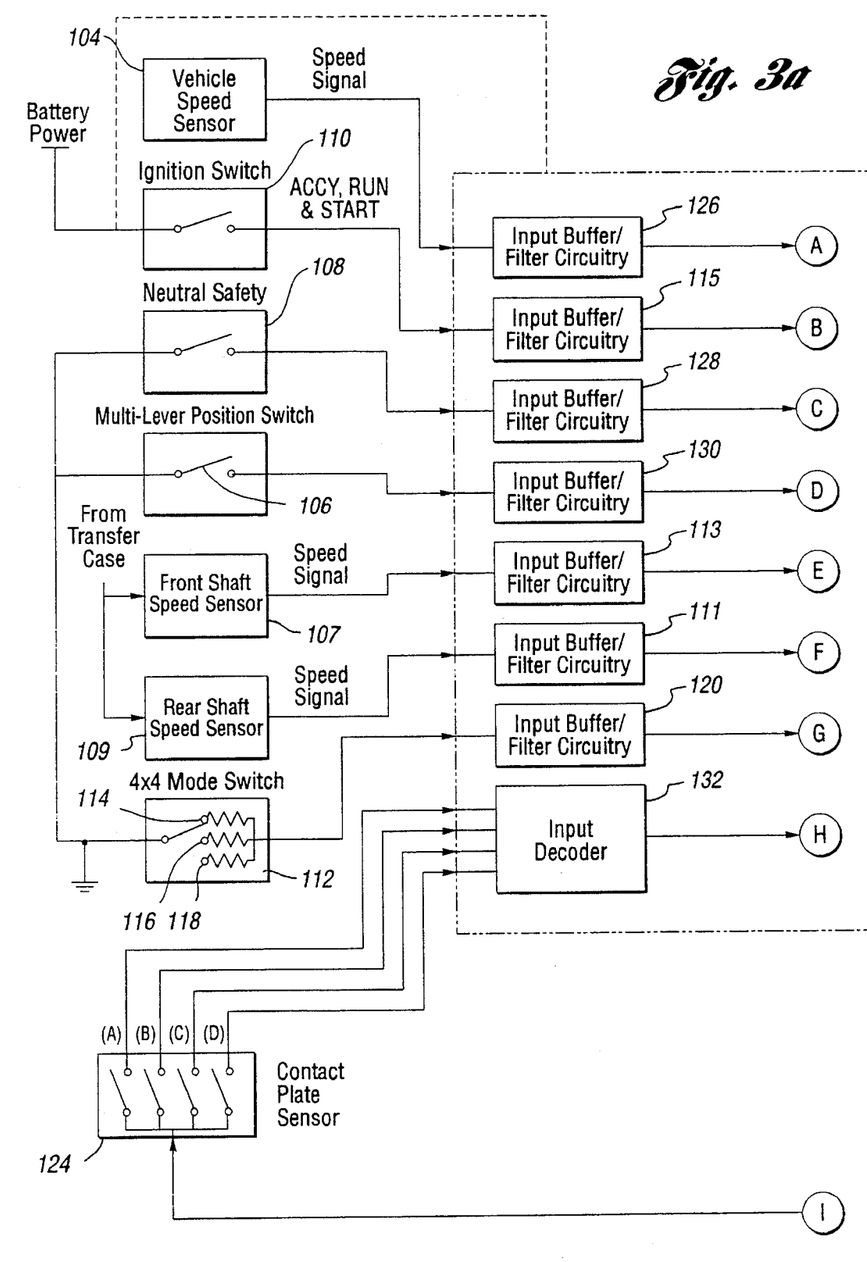
FIG. 3 is a schematic block diagram of the electronic controller including a microprocessor for actuating a reversible electric motor for shifting the positive drive clutch between its three operating modes.
Figure 3B:
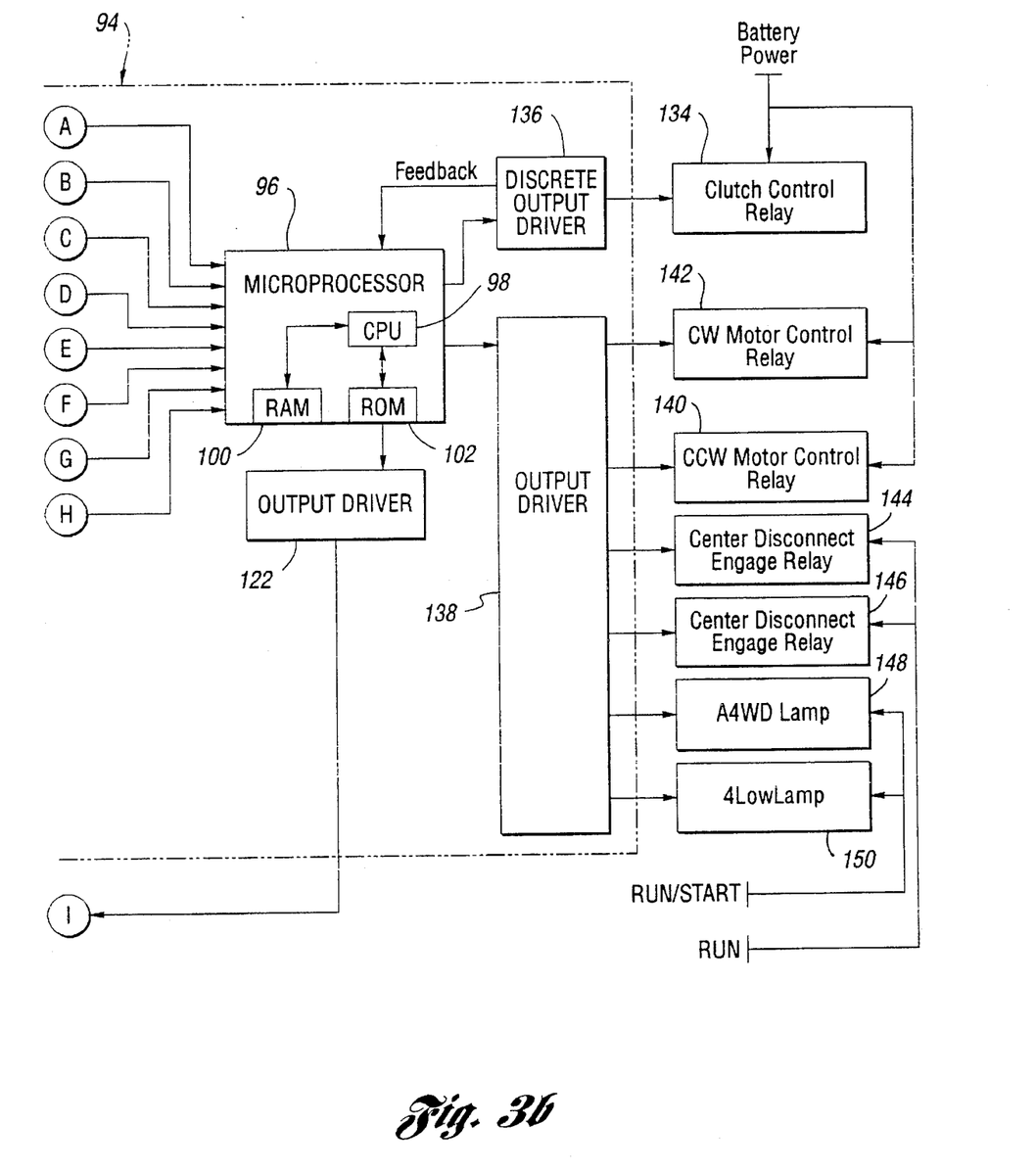

In FIG. 3, an electronic control module, which is comprised in part of a microprocessor 96, is indicated generally by reference numeral 94. The microprocessor 96 forms a part of the module 94. The microprocessor may be a digital type having a central processor unit 98, a plurality of temporary storage registers in a RAM portion 100 and ROM memory registers for storing control algorithms as indicated at 102. The microprocessor 96 may be of any of a number of commercially available microprocessors, an example of which is a microprocessor manufactured by Texas Instruments of Houston, Tex. (TMC371C0B0).

The control system for controlling the motion of the sleeve 88 includes a vehicle speed sensor 104 and a position sensor for a neutral switch as shown at 106. The position sensor 106 is closed when neutral is commanded by the operator. A gear shift lever neutral switch 108 also is closed when the gear shift lever for the transmission 20 is moved by the operator into the neutral position.

The engine ignition switch 110 provides battery power for the engine, the accessories and the engine starter motor. It also supplies a voltage to an input buffer filter circuit 115, the output of which is delivered to microprocessor 96. A front shaft speed sensor, mounted on the front transfer case as shown at 107, provides a speed signal to input buffer filter circuit 113. Rear shaft speed sensor 109 delivers a speed signal through input buffer and filter circuit 111 to microprocessor 96. A rear shaft speed sensor 109 provides a signal to the microprocessor through input buffer and filter circuit 111. This speed signal is required since under some conditions the rear wheels may be moving while the vehicle is stationary. For example, when the vehicle is on ice under such conditions, the microprocessor would process the information provided by speed sensor 109 to prevent completion of the routine described with reference to FIG. 4.

A manually operated 4×4 mode switch 112 can be moved by the operator to a two-wheel-drive position 114, an automatic four-wheel-drive mode position 116 and a four-wheel-drive low position 118. When any one of these mode positions is selected, a ground is established for the switch. The resistive value internal to the switch is passed through input buffer filter circuit 120 to the microprocessor 96.

A power supply, which may be 12 volts, is indicated at 122. It supplies power to a contact plate sensor 124 which indicates the mode of operation of the transfer case. This will be explained subsequently.

The input buffer filter circuit of the module 94 includes, in addition to the circuits 115 and 120, an analog-to-digital converter and filter circuit 126 which receives the vehicle speed signal and delivers it to the microprocessor 96. It converts the analog signal to a digital signal and filters out extraneous pulses and noise in the output of the speed sensor before it is delivered to the microprocessor 96.

Other input buffer and filter circuits, which function in the manner similar to the input buffer and filter circuit 126, include circuit 128 for the neutral safety switch and a filter 130 for the positions sensor switch 106.

A subcircuit 132 determines what type of mode signal to provide to the microprocessor 96. The signal that is delivered depends upon the position of the contact plate sensor 124. This decodes the digital information made available by the contact plate sensor 124, as will be described subsequently.

A battery power connection is provided for clutch control relay 134 for a discrete output driver 136. The driver 136 will provide a ground for the clutch control relay, which is used to shift the transfer case clutch sleeve 88 in FIG. 1 between its three operating positions. This discrete output driver is separate from the output drivers for the controller for the positive engagement clutch sleeve 88.

The output driver for the clutch sleeve 88 is indicated in FIG. 3 at 138. This driver may be any of a number of output driver circuits that are available commercially, including a Motorola driver circuit manufactured by Motorola in Tempe, Ariz. (MC33298).

The motor for the transfer case, indicated at 82 in FIG. 1, is controlled by a counterclockwise motor control relay circuit 140 and by a clockwise motor control relay circuit 142. The motor 82 is a reversible motor. It will move in one direction or the other depending upon whether the relay 142 or the relay 140 is actuated by the output driver 138.

A center disconnect engage solenoid for the collar 40 is indicated at 144. A disengage solenoid for the center disconnect clutch is shown at 146.

When the transfer case is in the four-wheel-drive automatic mode, a dash mounted light 148 is energized by the output driver. A corresponding dash mounted indicator light for four-wheel-drive low operating mode is shown at 150.

Referring next to FIG. 4, there is illustrated in flow diagram form the functional steps involved in the software control strategy for effecting neutral-tow engagement. At the start of the strategy, a check is made of the initial conditions that are required to be met if a neutral-tow condition is to be established. A timer is set at action block 152, which establishes a predetermined time, such as one second, during which a test is made to determine whether the initial conditions are met. At the same time, a shift counter is cleared as will be explained in connection with action block 182.

The microprocessor will determine whether the ignition switch is on or off. This is done at step 156. If it is determined at step 156 that the ignition switch is on, the routine will be interrupted and the function flow then will return to the start point in the routine. The neutral tow engagement strategy then will not proceed further during the current background control loop for the microprocessor, but it will begin again in the subsequent background loop. If the ignition switch is off, the routine will proceed to step 158, where a test is made to determine whether the operator has moved the transmission range selector lever to the neutral position. If the transmission is not in neutral, the routine will be interrupted, as described previously. If the transmission is in neutral, the routine will proceed to step 159 where a test is made to determine whether the vehicle speed is zero or is substantially zero. If the vehicle is moving, again the routine will be interrupted. If the vehicle is stopped of substantially stopped, the routine may proceed to step 162, where the initial condition timer is checked to determine whether the timer has expired. The three initial condition checks at steps 156, 158 and 160 should be completed within a time greater than the setting of the initial condition timer.

The shift to neutral tow engagement should occur during the time allowed by the four second timer, which is started at 154.

The contact plate sensor 124, which was described with reference to FIG. 3, develops a digital code, depending upon the position of the motor 82 as determined by a rotational switch plate, which will be described subsequently. The position of the position sensor will indicate the operating mode that the driveline currently assumes. Those operating modes are the two-wheel-drive high gear state, the neutral state, and the four-wheel-drive low gear state. The digital output indicating the position of the motor is read at action block 157. If that position is not valid, as determined at step 159, the routine will proceed to action block 160, where a fault or diagnostic state is entered. Following the execution of the diagnostic state, the routine will exit and return to the start of the strategy. If the position indicated at 159 is a valid position, the routine will proceed to action block 163 where it is determined whether the front axle disconnect 40 is engaged or disengaged. Front axle disconnect 40 is actuated by an engage solenoid and a disengage solenoid. In addition the transfer case motor, at action block 163, is adjusted to the neutral state from the current valid position.

At step 164 a check is made to determine whether the neutral state has been achieved at action block 163. If it has not yet been achieved, and if the check of the timer, which occurs at step 166, indicates that the timer has not yet expired, the routine will return at 168 so that the test at step 164 can be repeated. If the neutral state is not achieved within the time allowed by the four second timer, which is checked at step 166, the routine will exit, as shown at 170. Again, the fault or diagnostic state is entered at 160 since, these conditions indicate a malfunction. If the neutral state is completed, as determined at step 164, the routine will proceed to action block 172. At that point, both the clockwise motor relay 142 and the counter-clockwise motor relay 140, are actuated simultaneously. This has the effect of providing dynamic braking for the moving elements associated with the motor 82 and the drive pinion 84. This is done to stop the motor.

A check is made at step 174 to determine whether a motor is in fact stopped. If it has not stopped, the routine will be repeated, as indicated by function flow path 176, until the motor is in fact stopped. After the motor is stopped, it is determined at step 178 whether the motor position is at the neutral position. If it has stopped at the neutral position, the indicator lamp 148 or 150 is turned off at action block 180. If it has not stopped, the shift counter, which was set at action block 154 is incremented by one count to allow more time for the shift in neutral to occur. This added increment for the shift counter is added at action block 182.

A check is made then at step 184 to determine whether the shift counter reads "5" rather than "4". If the counter is reset at "5" and it is not yet expired, the motor circuit opposite to the motor circuit currently enabled is activated and the current motor circuit is deactivated. This occurs at action block 186, which causes the motor to reverse direction. Having reversed direction of the motor, the routine will proceed to the action block 157 as shown by function and flow line 188. This is a feedback check, as the routine previously described with reference to steps 159, 168, 174 and 178 is repeated. If a neutral position cannot be achieved within the increased count of the shift counter (i.e., if there are five failed attempts), the routine will exit to the fault or diagnostic state 160 since this condition indicates a malfunction.

Figure 4A:
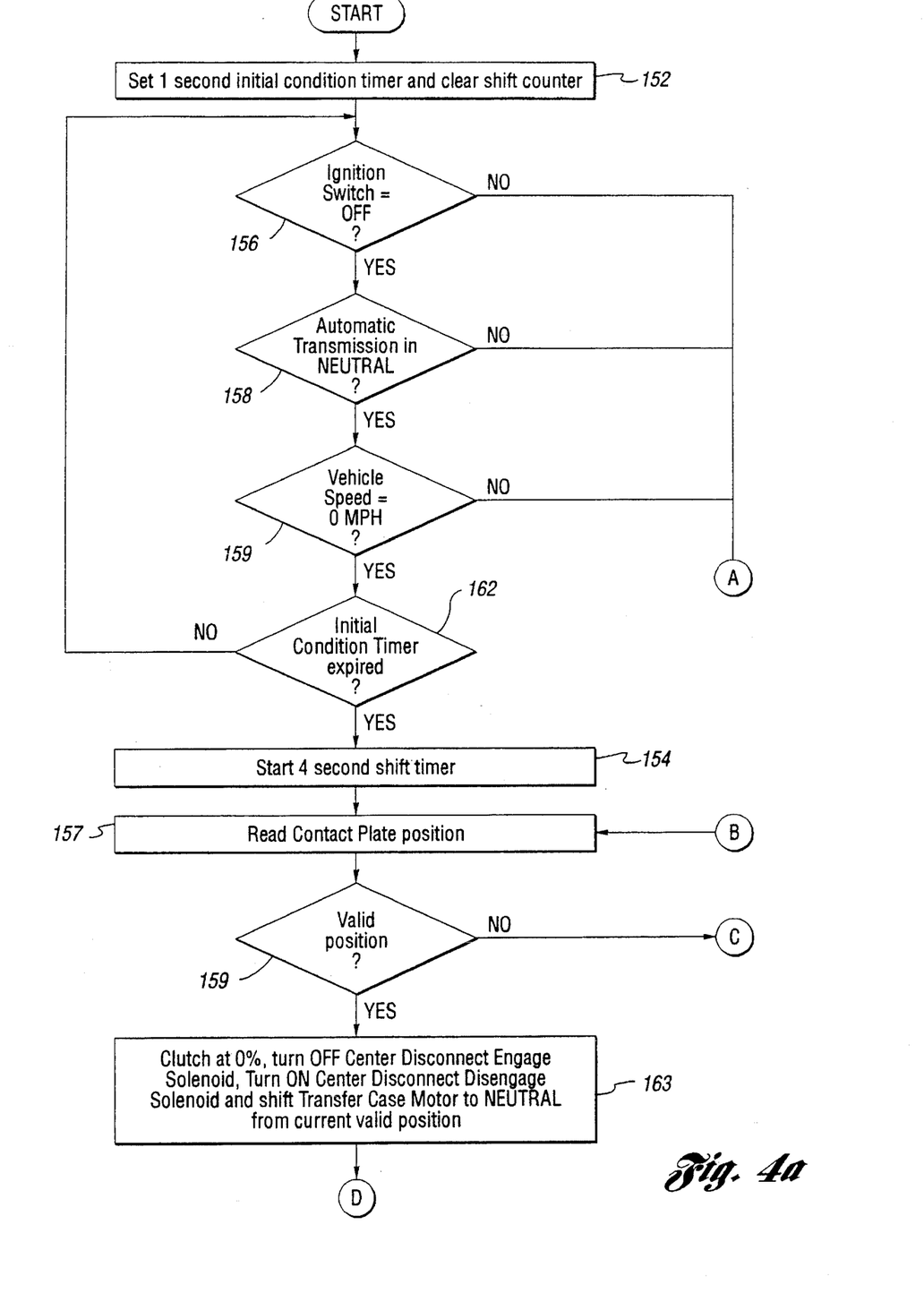
FIG. 4 is a flow diagram illustrating the sequential steps involved in the execution of control algorithms embodied in the motor control software for the microprocessor illustrated schematically in FIG. 3 as the neutral tow engagement strategy is carried out.
Figure 4B:
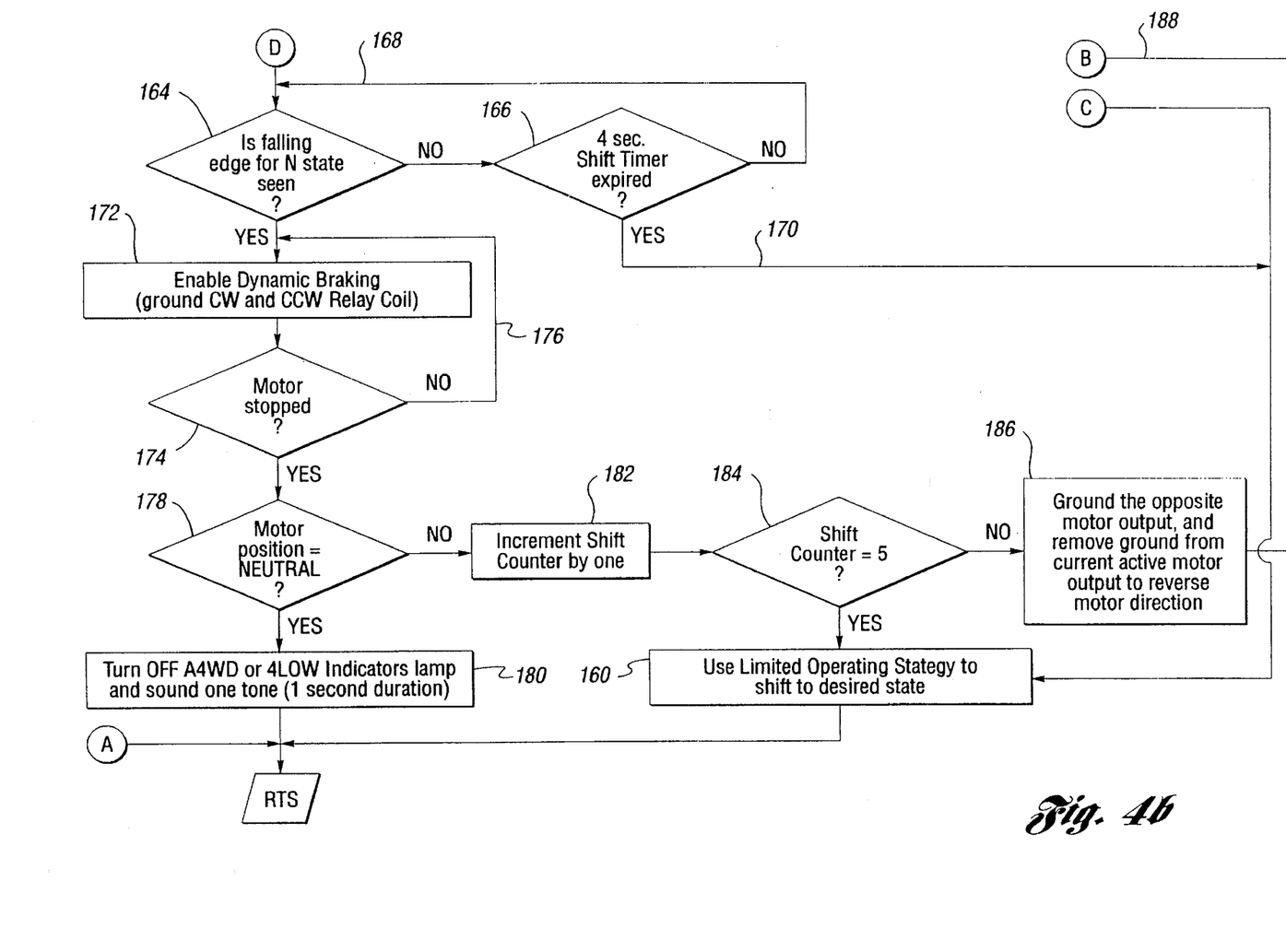
Figure 5A:
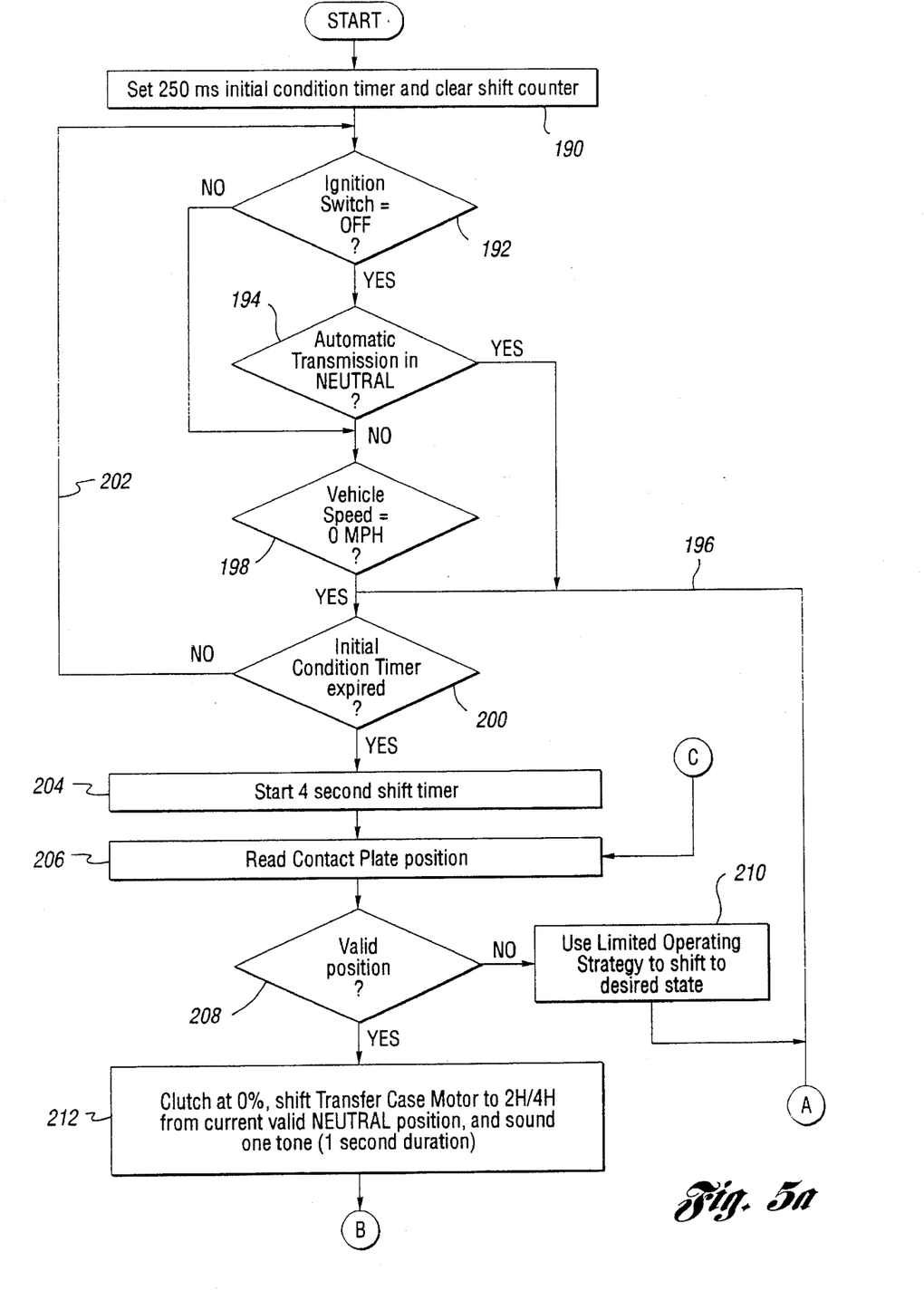
FIGS. 5A and 5B show the software control strategy involved in a neutral tow disengagement.

The neutral-tow disengagement strategy is illustrated in flow diagram form in FIGS. 5 and 5A. This resembles, for the most part, the neutral-tow engagement strategy described with reference to FIG. 4.

The neutral-tow disengagement strategy begins with the setting of an initial condition timer at action block 190. In the embodiment described here, the initial condition timer is set at 250 milliseconds. Simultaneously with the setting of the initial condition timer, the shift counter is cleared.

The test of the initial conditions, as in the case of the routine in FIGS. 4a and 4b, includes a test to determine whether the ignition switch is off at step 192. If it is off, a check is made at step 194 to determine whether the automatic transmission has been shifted by the operator to the neutral condition. If the transmission is in neutral, the routine will exit as shown at 196.

If the automatic transmission is not in neutral, as determined at step 194, a check is made at step 198 to determine whether the vehicle speed is zero. If the vehicle is not stopped, the routine will exit at 196 as previously described. If the vehicle is stopped, a test is made at step 200 to determine whether the initial condition timer has expired. If it has not expired, the routine is repeated, as indicated by the function flow path 202. The initial condition timer is used to make sure that the controller has enough time for completion of each of the initial condition checks.

If the ignition switch is on, the step at 194 is bypassed, and the routine proceeds directly to step 198 where the vehicle speed is tested.

A four-second timer is started at action block 204 if the routine proceeds to step 200. The position of the motor contact plate, as determined by the contact plate sensor 124, then is read at action block 206. It is determined at step 208 whether the position of the contact plate is a valid position. If it is not, the routine will enter the fault or diagnostic state routine 210 which corresponds to the previously described routine 160 shown in FIG. 4. If the position is valid, the clutch is in the neutral position and a shift occurs to the two-wheel-drive state from the current neutral state. This is done at action block 212.

The routine then proceeds to step 214, as seen in FIG. 54, where it is determined whether the shift to the two-wheel-drive state is completed. This is indicated by the falling edge of the voltage that is applied to the motor relay for motor 82. If the shift is not completed, an inquiry is made at step 216 as to whether the four-second timer set at action block 204 has expired. If it has not expired, the step 214 is repeated.

Figure 5B:
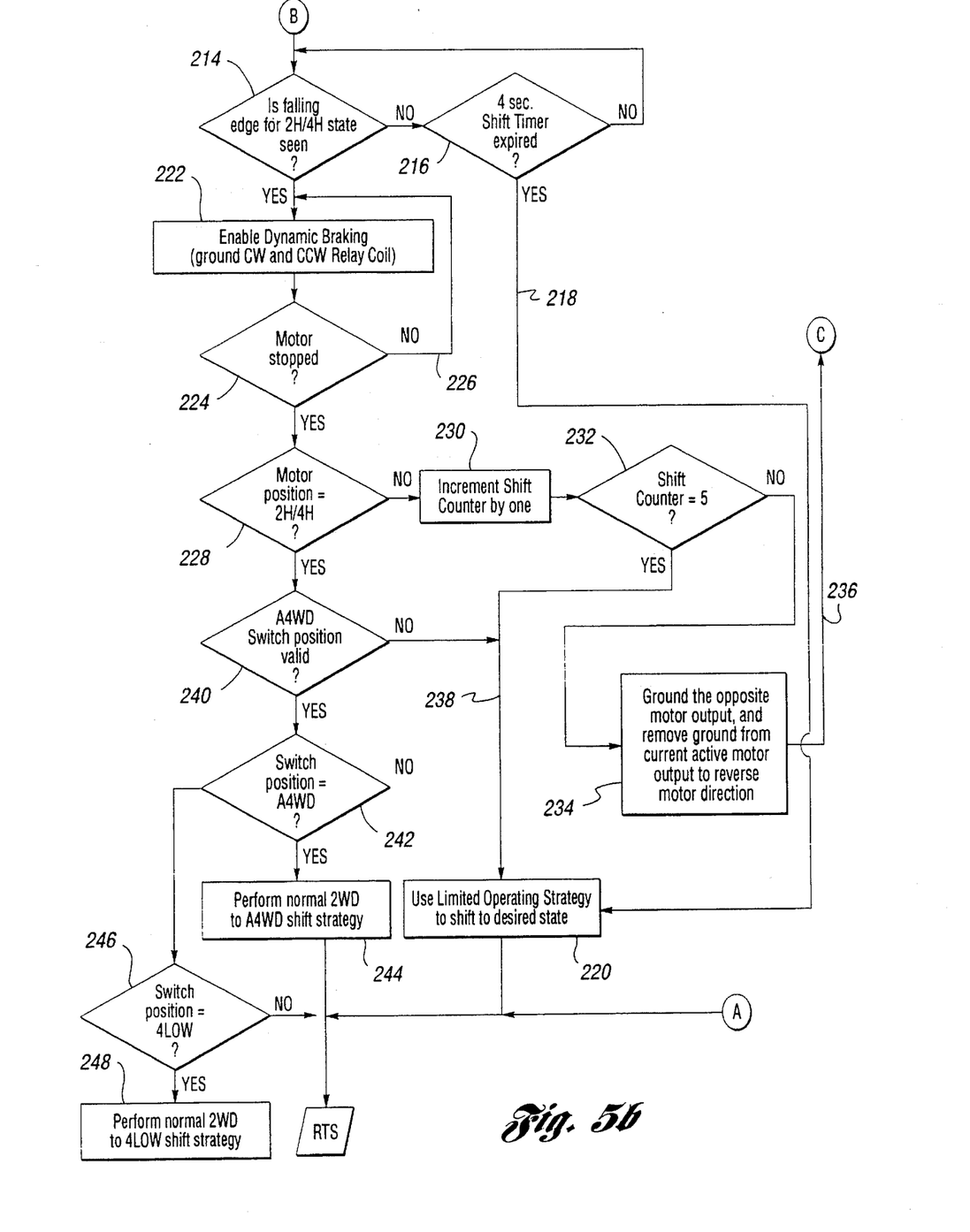

If repetitive tests at 214 do not indicate that the shift is completed within the four-second time set by the shift timer, the routine will exit at 218 and a default and diagnostic state is entered at 220. If the shift is completed, the routine proceeds to action block 222 to enable dynamic braking of the motor. This is done by simultaneously activating the clockwise motor control relay and the counterclockwise motor control relay previously described with reference to FIG. 3. Following the dynamic braking of the motor, a test is made at action block 224 to determine whether indeed the motor has stopped. If it has not, further dynamic braking occurs, as indicated by function flow line 226. If the motor has stopped, the motor position is tested at step 228 to determine whether the engaged position is in place. If it is not in place, the shift counter is incremented by a count of "1" at action block 230. This produces a shift count of "5", and a test is made at step 232 to determine whether five attempts have been made to successfully complete the shift to the disengaged state.

If fewer than five attempts to enter the disengaged state have not been made, the opposite motor is activated to cause a reversal in the direction of the motor. This is done at action block 234. Following the reversal of the motor at action block 234, the routine proceeds, as shown at 236, to the previously described action block 206 where the contact plate position again is read. This is a feedback check, and the feedback routine then proceeds as previously described. If after five attempts the shift still has not taken place, the routine will proceed directly through function flow path 238 to the diagnostic mode 220 since a malfunction will have been indicated.

Once the motor has been shifted to the two-wheel-drive position, a check is made at step 240 to determine whether the 4×4 mode switch position is valid. This is the position of the 4×4 mode switch at 112 described with reference to FIG. 3. If that position is not valid, again, the routine proceeds through function flow path 238 to the diagnostic state 220. If the four-wheel-drive switch position is valid, the routine will proceed to step 242 where it is determined whether the switch is in the automatic four-wheel-drive position, or in the two-wheel-drive position, or in the all-wheel drive low position. If it is in the automatic four-wheel-drive position, normal automatic four-wheel-drive control strategy takes place, as indicated in action block 244.

If the test at step 242 is negative, the switch position is checked again to determine whether the four-wheel-drive low mode is in effect. This is done at step 246. If the inquiry at 246 is positive, a normal two-wheel-drive to four-wheel-drive low strategy occurs at action block 248.

Figure 6:
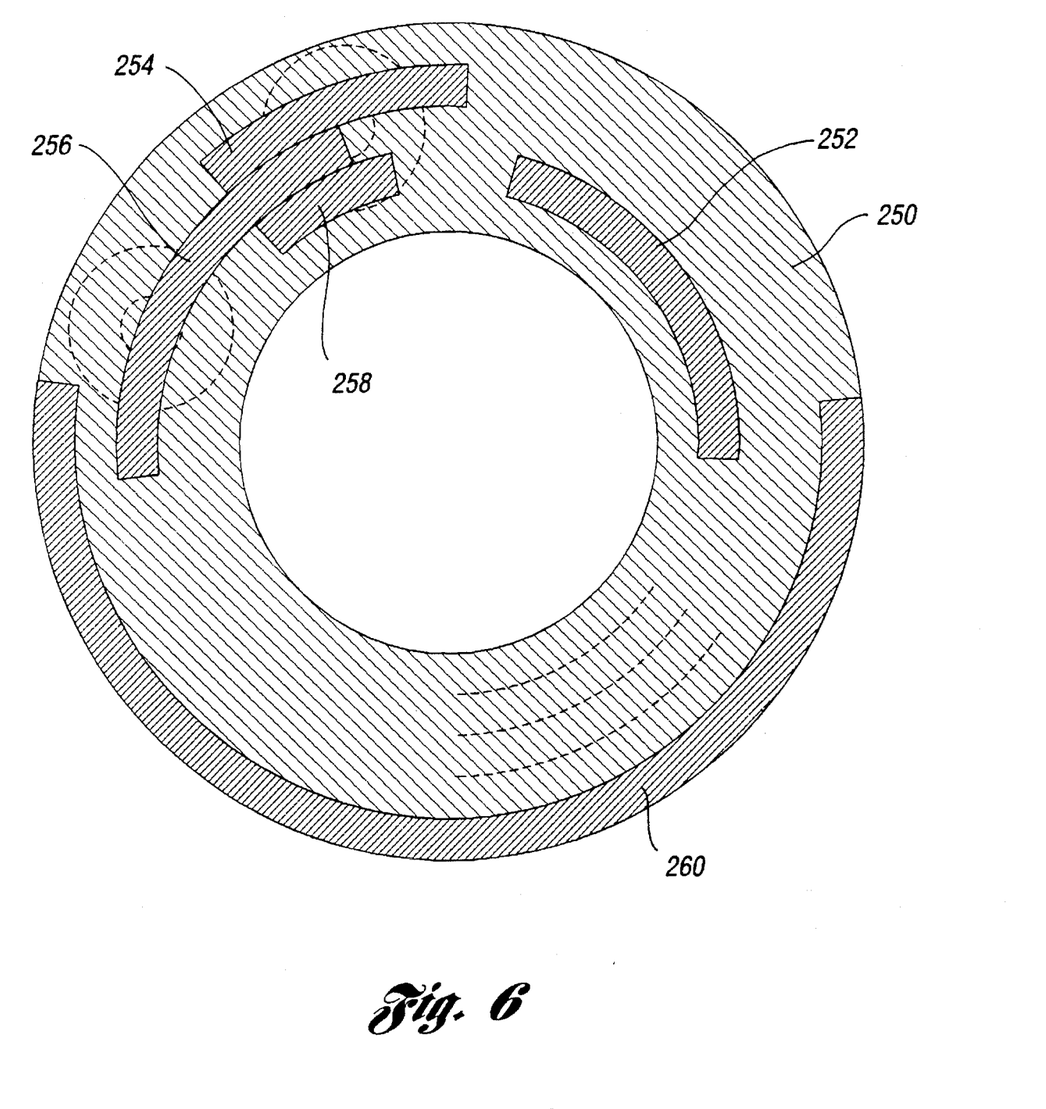
FIG. 6 is a schematic representation of a brush-type switch plate comprising a switch disc connected to a motor shaft of a reversible electric motor.

The contact plate referred to in this specification is illustrated schematically in FIG. 6. It consists of a plate or disc connected drivably to the motor rotor having an axis coinciding with the center of the disc illustrated in FIG. 6. The disc comprises a series of conductive portions that are arranged in such a way that the contact plate may produce a binary code corresponding to each operating condition of the motor. The binary code is distributed through contact brushes to the input conditioning portion of the microprocessor, as described with reference to FIG. 3. A signal on each brush represents a binary digit (a bit). The bits represented by the signals on the brushes perform a binary code that indicate the position of the motor.

The disc in FIG. 6 comprises conductive material 250 and arcuate segments, some of which are indicated at 252, 254, 256, 258 and 260. As the brushes engage the conductive material, different patterns of contact are established depending upon the position of the disc. A distinct binary code is generated for each of the positions of the clutch corresponding to four-wheel drive low, two-wheel drive high, and neutral. Provision is made also for moving the disc through at least one intermediate position between the two-wheel drive high gear state and the neutral state and through an intermediate position between the neutral state and the four-wheel drive low gear state. This is done to provide an opportunity for the inertia of the system components to respond to a command for a change in gear state.

As indicated in the following table, there are nine regions of the disc that are contacted by the brushes. Each region corresponds to a digital code, comprising information in each set of five bits, as indicated in the second column of the table. The description of the operating state corresponding to each code is set forth in the third column of the table.

| REGION | CODE | ROTATIONAL POSITION |
|--------|------|---------------------|
| 100 | 1000 | Mechanical Stop |
| 101 | 1010 | Intermediate position |
| 102 | 1011 | "Two-wheel-drive high" gear state |
| 103 | 1111 | Intermediate position |
| 104 | 1110 | Intermediate position |
| 105 | 0110 | Neutral for a four-wheel drive |
| 106 | 0111 | Intermediate position |
| 107 | 0101 | "Four-wheel-drive low" gear state |
| 108 | 1101 | Mechanical Stop |

It should be noted in the table that as each distinct binary code is developed corresponding to the various operating positions of the motor, only a single bit of each code changes from a "1" state to a "0" state, or from a "0" state to a "1" state. For example, when the motor disc changes from region 101 to 102, the fourth bit of the codes for regions 101 or 102 are changed and the others remain the same. The bit that changes is the bit that was held constant during the change from region 100 to 101.

For a further description of the position encoding method and the switching apparatus for the contact plate sensor 124, reference may be made to co-pending patent application Ser. No. 08/192,520, filed Feb. 9, 1994. That application is assigned to the assignee of this invention. Application Ser. No. 08/192,520 was filed by D. O. Stollsteimer, R. S. Alvey, the present inventor, P. W. Gibson, and T. A. Snorer.

Although the preferred embodiment of the invention has been described, it will be apparent to a person skilled in the art that variations may be made to the circuit that is particularly described without departing from the scope of the invention as defined by the following claims.

I claim:

1. An automatic four-wheel-drive driveline for a vehicle having front and rear road wheels comprising a multiple-ratio transmission having a torque input shaft adapted to be connected drivably to a vehicle engine having an engine ignition switch;

a torque transfer gear assembly having a torque input element connected to said torque input shaft, a torque output element and a reaction element;

a rear-wheel drive shaft, a front-wheel drive shaft, front axle differential gearing having a torque input gear drivably connected to said front-wheel drive shaft, front-wheel axle shafts, said front axle differential gearing having torque output gears drivably connected to said front-wheel axle shafts;

said torque transfer gear assembly having driving and driven elements, a torque transfer member drivably connecting said driving element and said driven element, torque transfer clutch means having a movable clutch element for selectively establishing a first torque flow path extending to said rear-wheel drive shaft from said torque input element when it is in a first engaged position and for selectively establishing a second torque flow path extending to said rear-wheel drive shaft from said torque output element when it is in a second engaged position, said movable clutch element having a neutral position intermediate said first and second engaged positions whereby a high speed drive mode, a low speed drive mode or a neutral mode can be selected;

a reversible motor means for actuating said movable clutch element and automatic control means for actuating said motor means in response to an operator command for a change in said modes;

said control means including means for verifying a set of initial driveline operating conditions and an electronic processor means for controlling operation of said reversible motor means, and detection means for developing control signals that indicate detection of either the presence or the absence of said operating conditions, said processor means responding to said control signals to effect a change from one of said modes to another;

said initial operating conditions including a vehicle speed of substantially zero, a neutral drive state of said multiple-ratio transmission, and an off state for said ignition switch for said engine.

2. The combination as set forth in claim 1 wherein said processor means includes means for timing the detection of the presence or absence of said operating conditions and for disabling said detection means upon expiration of a predetermined engagement detection time prior to completion of operating condition detection during neutral engagement of said movable clutch element.

3. The combination as set forth in claim 1 wherein said processor means includes means for timing the detection of the presence or absence of said operating conditions and for disabling said detection upon expiration of a predetermined disengagement detection time prior to completion of said operating condition detection during neutral disengagement of said movable clutch element.

4. A neutral-tow mechanism for an automatic four-wheel-drive driveline for a vehicle having front and rear road wheels comprising a multiple-ratio transmission having a torque input shaft adapted to be connected drivably to a vehicle engine having an engine ignition switch;

a rear-wheel drive shaft, a front-wheel drive shaft, front axle differential gearing having a torque input shaft drivably connected to said front-wheel drive shaft, front-wheel axle shafts, said front axle differential gearing having torque output gears drivably connected to said axle shafts;

torque transfer gear assembly having driving and driven elements in a torque flow path extending to said front wheel drive shaft, said rear-wheel drive shaft being connected to said driven element in four-wheel drive and two-wheel drive modes;

said torque transfer gear assembly also having a torque input shaft, a torque input sun gear, a torque output planet carrier and a fixed ring gear, torque transfer clutch means having a movable clutch element for selectively establishing a connection between said sun gear and said rear-wheel drive shaft when it is in a first engaged position and for connecting said rear-wheel drive shaft to said carrier when it is in a second engaged position, said movable clutch element being adapted to assume a neutral position intermediate said first and second engaged positions;

a reversible motor means for actuating said movable clutch element to effect a high speed drive first mode, a low speed drive second mode and a neutral third mode, and control means responsive to an operator command to activate said motor means between pairs of said three positions corresponding respectively to said first, second and third modes;

said movable clutch element comprising an internally splined sleeve slidably splined to said torque output shaft;

said sleeve drivably engaging said sun gear when it assumes said one engaged position to establish a direct driving connection between said sun gear and said driven element;

said sleeve drivably engaging said carrier when it assumes a second position to establish a geared connection between said torque input shaft and said torque output shaft;

said sleeve, when it is in a position intermediate said one position and said second position, effecting a neutral mode;

said control means includes means for verifying a set of initial driveline operating conditions and an electronic processor means for controlling operation of said reversible motor means; and detection means for developing control signals that indicate detection of the presence or absence of said operating conditions, said processor means responding to said control signals to effect a change from one of said first, second and third modes to another;

said initial operating conditions including a vehicle speed of substantially zero, a neutral state of said multiple-ratio transmission, and an off state for said ignition switch for said engine.

5. The combination as set forth in claim 4 wherein said processor means includes means for timing the detection of the presence or absence of said operating conditions and for disabling said detection means upon expiration of a predetermined engagement detection time prior to completion of said operating condition detection during neutral state engagement of said movable clutch element.

6. The combination as set forth in claim 4 wherein said processor means includes means for timing the detection means of the presence or absence of said operating conditions and for disabling said detection means upon expiration of a predetermined disengagement detection time prior to completion of said operating condition detection during neutral state disengagement of said movable clutch element.

* * * * *